Nov. 18, 1969 H. F. QUINN 3,479,655
MAGNETIC STORAGE DEVICES WITH SHIELDING
BETWEEN INPUT AND OUTPUT
Filed Oct. 26, 1964 3 Sheets-Sheet 1

INVENTOR.
HUBERT F. QUINN
BY Samuel Kane
ATTORNEY

Nov. 18, 1969 H. F. QUINN 3,479,655

MAGNETIC STORAGE DEVICES WITH SHIELDING BETWEEN INPUT AND OUTPUT

Filed Oct. 26, 1964 3 Sheets-Sheet 2

INVENTOR.
HUBERT F. QUINN

BY Samuel Kane

ATTORNEY

INVENTOR.
HUBERT F. QUINN
BY Samuel Kane
ATTORNEY 3,479,655

MAGNETIC STORAGE DEVICES WITH SHIELDING BETWEEN INPUT AND OUTPUT

Hubert F. Quinn, Ossining, N.Y., assignor to Burroughs Corporation, Detroit, Mich., a corporation of Michigan Filed Oct. 26, 1964, Ser. No. 406,272
Int. Cl. G11c *5/02, 11/06*
U.S. Cl. 340—174 15 Claims

ABSTRACT OF THE DISCLOSURE

A magnetic storage device utilizing elements of magnetic storage material such as toroidal magnetic cores and thin films, for example, is provided with a shielding means and with input and output conductors so positioned that capacitively and inductively coupled noises between input and output conductors are effectively reduced to reasonable minima.

This invention relates generally to magnetic devices for handling information, and more particulaly to magnetic storage devices for performing memory and logical functions in computing systems.

The present trend in the design of magnetic storage devices is toward miniaturization and high density packaging of magnetic storage components. Because of this dense packaging, the problems due to noise coupling become more serious. Thus in many cases where a closely packed configuration of magnetic storage media and drive and output conductors is arranged to provide memory or logical functions (or both), the information handling efficiency of the system is considerably reduced owing to spurious signals induced in the output conductors by inductive and capacitive coupling of energy from the several drive or input conductors. In connection with particular magnetic storage media, such as thin films, reference is made to an article, entitled "A Compact Coincident-Current Memory," by A. V. Pohm and S. M. Rubens, published by American Institute of Electrical Engineers in an issue of "Proceedings of the Eastern Joint Computer Conference," the conference being held on Dec. 10–12, 1956, in which the authors include a discussion of noise arising from coupling. See also an article, entitled "The Future of Thin Magnetic Films," by E. E. Bittmann, published by The Macmillan Company, New York, 1962, in a book entitled "Large-Capacity Memory Techniques for Computing Systems," in which the author also includes a discussion of coupled noise problems.

An object of this invention is to provide improvements in magnetic storage devices which make possible the implementation of high density packaging of such devices.

Another object of the invention is to provide a construction and arrangement for magnetic storage media and associated electric current conductors whereby capacitively and inductively coupled noise signals in memory and logical matrices, and the like, will be effectively reduced to reasonable minima.

In accordance with the above objects and considered first in one of its broad aspects, the invention provides a magnetic storage device wherein elements of magnetic storage material are disposed in an electrical array, and an electric current output conductor having at least a substantial portion of its length on one side of the array is inductively coupled to a plurality of the magnetic storage elements. A plurality of electric current input conductors are arranged betwen the substantial portion of the output conductor and the other side of the array, and each input conductor is inductively coupled to a plurality of the magnetic storage elements. Highly conductive, electrically conductive material is constructed and arranged to provide both electrostatic and electromagnetic shielding between at least the substantial portion of the output conductor and the input conductors.

The invention will be more clearly understood when the following detailed description of preferred embodiments thereof is read in conjunction with the accompanying drawings in which.

Figure 1:
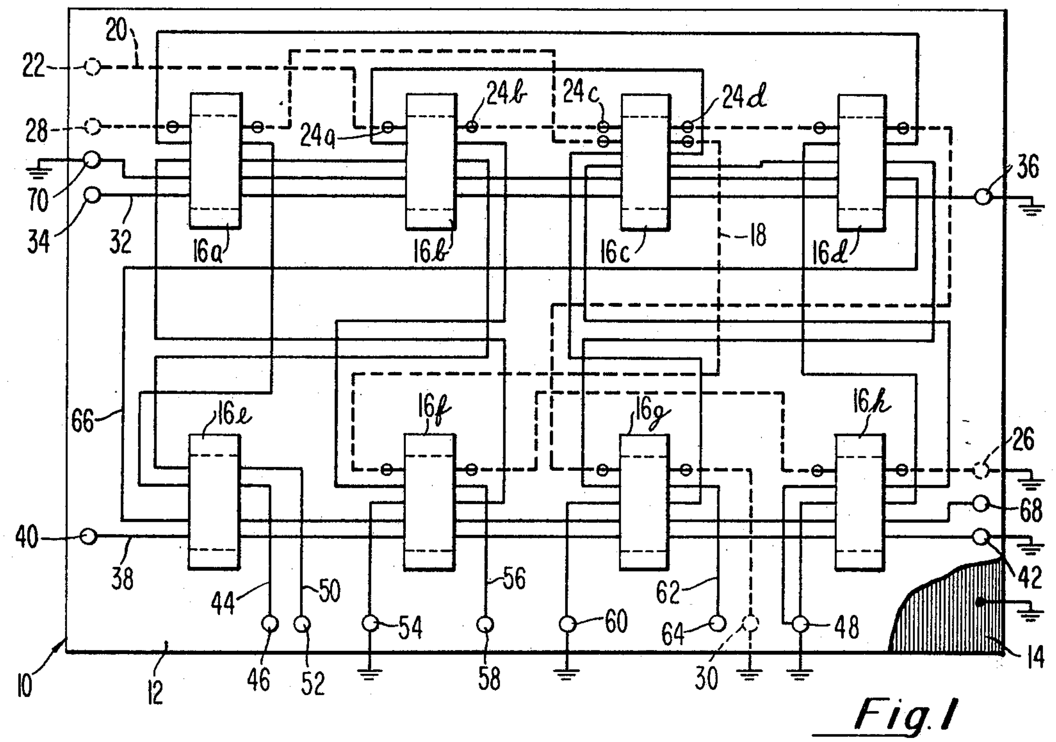
FIG. 1 is a plan view of a binary adder matrix constructed in accordance with the invention.
Figure 2:
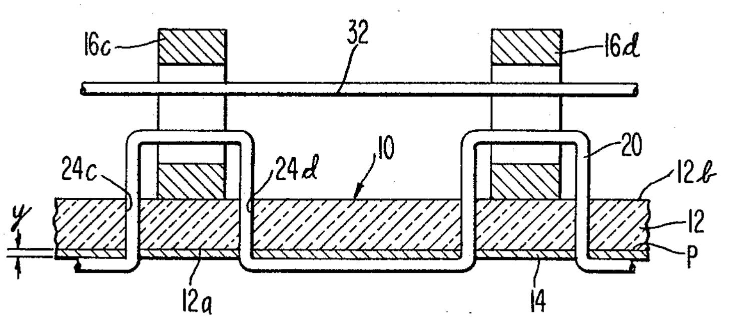
FIG. 2 is an enlarged sectional view of a fragment of the matrix shown in FIG. 1.

Turning now to the details of the drawing, and first with reference to the embodiment of the invention shown in FIGS. 1 and 2 thereof, the binary adder matrix comprises a panel 10 constructed of a mounting board 12 of electrically insulating material and a grounded layer of highly conductive, electrically conductive non-magnetic shielding material 14 such as copper, brass, silver or aluminum, for example, bonded to the bottom surface 12*a* of the mounting board 12.

On the upper surface 12*b* of the board 12 there is provided a matrix of magnetic storage media, in this case a 2 x 4 matrix of square-loop-type ferrite toroidal magnetic cores 16*a*–16*h*, each having two stable states of magnetization. These magnetic cores are illustrated as being arranged in a common plane relative to the top surface of the board 12, however this arrangement is illustrative only, since the cores may be arranged in any particular electrical array, and which need not be planar. Thus the expression "electrical plane" or "electrical array"' refers to any arrangement or layer of magnetic storage media and which includes, but is not limited to, a planar array of such elements.

On each side of appropriate ones of the magnetic cores, depending upon the construction, there are provided suitable openings for threading the output or sense wire conductors 18 and 20 from one side of the panel 10 to the other. For example, the carry output, or sense, conductor 20 commences at a terminal 22 and runs along the bottom of the panel 10 to an opening 24*a*, and thence upward through this opening and through the core 16*b* to an opening 24*b*, and thence downward through this opening to the botom of the panel 10, at which place it runs along the panel to the vicinity of the core 16*c* at which place it is similarly threaded upward through an opening 24*c*, and thence through the core 16*c* and downward through an opening 24*d* to the underside of the panel 10, to be routed further. In this manner, the sense conductor 20 threads up and down from one side of the panel 10 to the other and links the magnetic cores 16*b*, 16*c*, 16*d* and 16*g*, and connects at its other end to a ground terminal 30.

The sum output, or sense, conductor 18 commences at a terminal 28 and is threaded up and down through openings in the panel 10 in a manner similar to the carry output conductor 20, and links the magnetic cores 16*a*, 16*c*, 16*f* and 16*h*, and connects at its other end to a ground terminal 26.

An input drive conductor 32 commences at a terminal 34, links the magnetic cores 16_a_, 16_b_, 16_c_ and 16_d_ and is connected to a ground terminal 36. An input drive conductor 38 commences at a terminal 40, links the magnetic cores 16_e_, 16_f_, 16_g_ and 16_h_ and is connected to a ground terminal 42. An input drive conductor 44 commences at a terminal 46, links the magnetic cores 16_e_, 16_a_, 16_d_ and 16_h_ and is connected to a ground terminal 48. An input drive conductor 50 commences at a terminal 52, links the magnetic cores 16_e_, 16_b_, 16_a_ and 16_f_ and is connected to a ground terminal 54. An input drive conductor 56 commences at a terminal 58, links the magnetic cores 16_f_, 16_b_, 16_c_ and 16_g_ and is connected to a ground terminal 60. An input drive conductor 62 commences at a terminal 64, links the magnetic cores 16_g_, 16_d_, 16_c_ and 16_h_ and is connected to the ground terminal 48. An input drive reset conductor 66 commences at a terminal 68, links all of the magnetic cores 16_a_–16_h_ and connects to a ground terminal 70.

From the above description, it will now be seen that the input conductors are on one side of, or above, the shield layer 14 and that substantial portions of the output conductors 18 and 20, shown in dotted lines in FIG. 1, are on the other side of, or below, the shield layer 14.

Selecting the magnetic core 16_c_ for purposes of illustration, a write operation is provided by energizing two input drive conductors, for example, the input drive conductors 32 and 62, with half-select currents of such polarity that their magnetic fields add to thereby establish or change the state of magnetization of the selected magnetic core 16_c_, depending upon its previous state of magnetization. Thus in the binary system the write operation consists of storing either a "0" or a "1" in the selected magnetic core, represented by one or the other states of magnetization, as selected. Considering the same selected magnetic core 16_c_, a read operation is provided by energizing the input drive reset conductor 66 with a full-select current of such polarity that its magnetic field will be in a direction opposite to that of the write magnetic fields to thereby switch the magnetic core 16_c_ to its other state of magnetization.

From an inspection of FIG. 2, wherein for purposes of simplicity there are shown only one input conductor 32 and one output conductor 20, it will be perceived that electrostatic screening action and minimization of capacitively coupled noise between the input and output conductors are obtained in two ways. First, by physically separating the input conductors from substantial portions of the output conductors, and secondly, by establishing an electrostatic shield in the form of the highly conductive, electrically conductive, non-magnetic metallic sheet 14 between the input conductors and the substantial portions of the output conductors.

The electromagnetic shielding against inductively coupled noise depends upon the attenuation of an electromagnetic wave in passing through a highly conductive medium. A magnetic field due to current flow in a drive conductor such as the input drive conductor 32, shown in FIG. 2, is attenuated in accordance with the equation:

$$H_z = H_z^1 e^{-\alpha y} e^{j\omega t - \beta y}$$

where $H_z^1$ is the field intensity at the interface P, $y$ is the thickness of the shield layer 14 measured perpendicular to the interface P, and $$\alpha = \sqrt{\pi f \mu_2 \delta_2}$$

where $f$ is the frequency of the magnetic field variation and $\mu_2$ and $\delta_2$ are respectively the permeability and conductivity of the high conductivity shield material 14. Given $\mu_2$ and $\delta_2$ for any suitable shield material 14, the thickness $y$ of the shield material 14 may be adjusted to yield any desired attenuation.

Thus, any noise coupled into the output sense conductor 20, for example, by energization of the input drive conductors as described previously, will be effectively minimized, so that a signal induced in the sense conductor 20 by the magnetic flux change in the core 16_c_ will be readily detectable.

Figure 3:
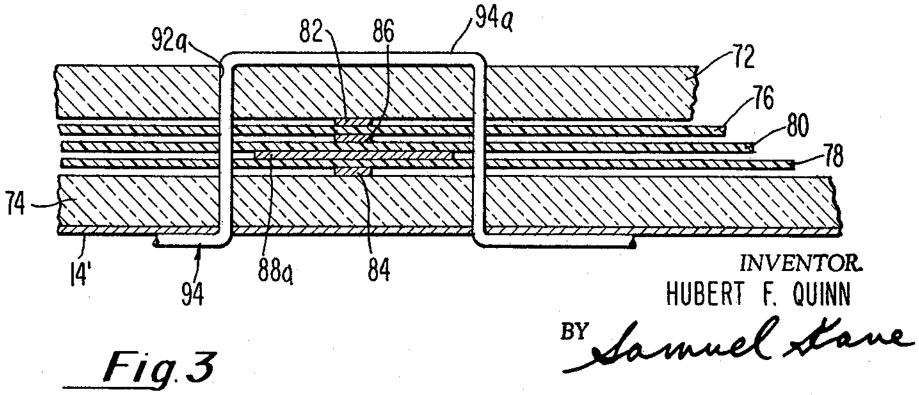
FIG. 3 is an enlarged sectional view of a fragment of a modification of the invention.
Figure 4:
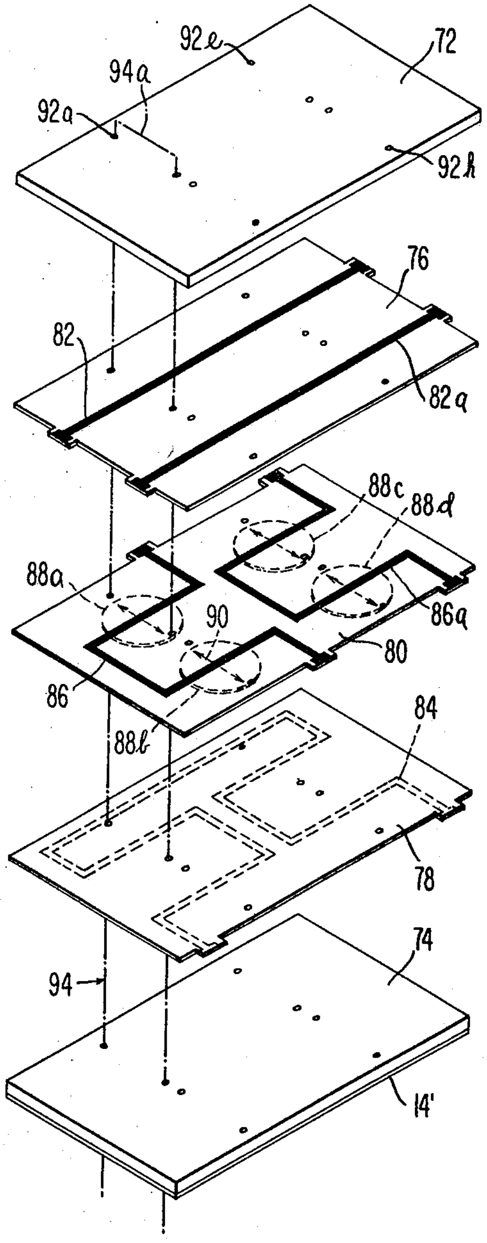
FIG. 4 is an exploded or separated view of the modification illustrated in FIG. 3.
Figure 7:
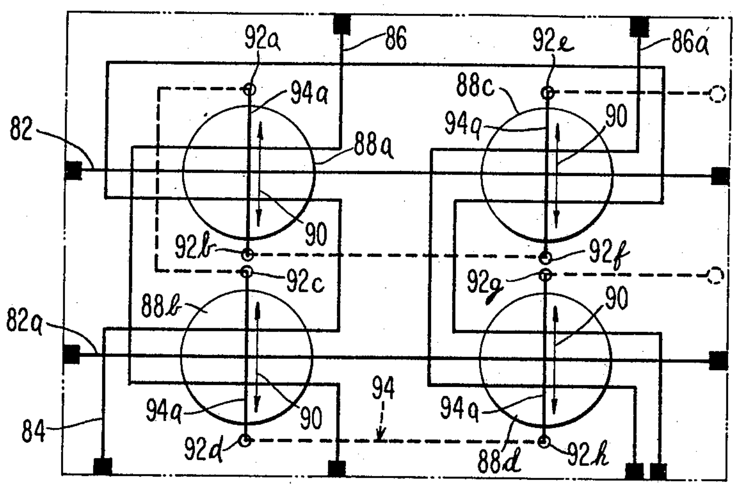
FIG. 7 is a diagrammatic plan view of the modification shown in FIGS. 3 and 4, and with insulating and shielding material omitted.

FIGS. 3, 4 and 7 illustrate a modification of the invention in which there is provided an upper panel 72 of electrically insulating material, such as glass, for example, and a lower substrate 74 of electrically insulating material which may also be glass, and on the lower surface of which is bonded or otherwise suitably placed a layer of the highly conductive, electrically conductive, non-magnetic metallic shielding material 14'. Sandwiched between the upper and lower panels 72 and 74 are a number of intermediate panels 76, 78 and 80 of electrically insulating material such as Mylar, for example, for supporting the various input conductors and magnetic storage media, all of which have a flat cross-section similar to printed circuits.

Bonded to the uper surface of the panel 76 (FIG. 4) are two input drive conductors 82 and 82_a_, and bonded to the lower surface of the panel 78 is an input reset conductor 84. Two input drive conductors 86 and 86_a_ are bonded to the upper surface of the panel 80, and a plurality of magnetic storage media in the form of elements 88_a_–88_d_ of thin film magnetic material are deposited on, or otherwise bonded to, the lower surface of the panel 80. The thin film elements have an easy or preferred direction of magnetization indicated by the double-headed arrows 90. Thus in the binary system when a thin film element is magnetized in one direction along the easy axis 90 it may represent a binary "0," and when magnetized in the oposite direction it would then represent a binary "1."

The assembly (FIGS. 3, 4 and 7) is provided with openings 92_a_–92_h_ which extend through the package through the various layers of insulating material and shielding and these openings are placed on opposite sides of the thin film elements 88_a_–88_d_, as is indicated most clearly in FIG. 7. Through these openings 92_a_–92_h_ is threaded an output sense wire 94 having its upper external portions 94_a_ crossing over and inductively coupled to the thin film elements 88_a_–88_d_. The input conductors are positioned, as shown, to cross over or under respective ones of the thin film elements 88_a_–88_d_ in inductive relation thereto, and also so that magnetic fields generated by currents in these conductors will be preferably parallel to the easy axes of magnetization 90. The portions 94_a_ are preferably orthogonal to the input conductors, as shown, to further reduce undesirable noise coupling between the input conductors and the output conductor portions 94_a_.

A write operation is provided with the modification shown in FIGS. 3, 4 and 7 by energizing two input conductors, for example the input conductors 82 and 86 associated with the thin film element 88_a_, with half-select currents of such polarity that their magnetic fields add to either establish or switch the state of magnetization of the exemplary thin film element 88_a_, depending upon its previous state of magnetization. A read operation is provided by energizing the input reset conductor 84 with a full-select current of such polarity that its magnetic field will be in a direction opposite to that of the write fields thereby to switch the state of magnetization of the thin film element 88_a_.

Thus with the input conductors (FIGS. 3 and 4) positioned on one side of, or above, the shield layer 14' and with a substantial portion of the sense output conductor 94 (FIGS. 3 and 7) positioned on the other side of, or below, the shield layer 14', and with the portions 94_a_ of the output conductor preferably orthogonal to the input conductors, it will be seen that inductively and capacitively coupled noise will be reduced considerably.

Figure 5:
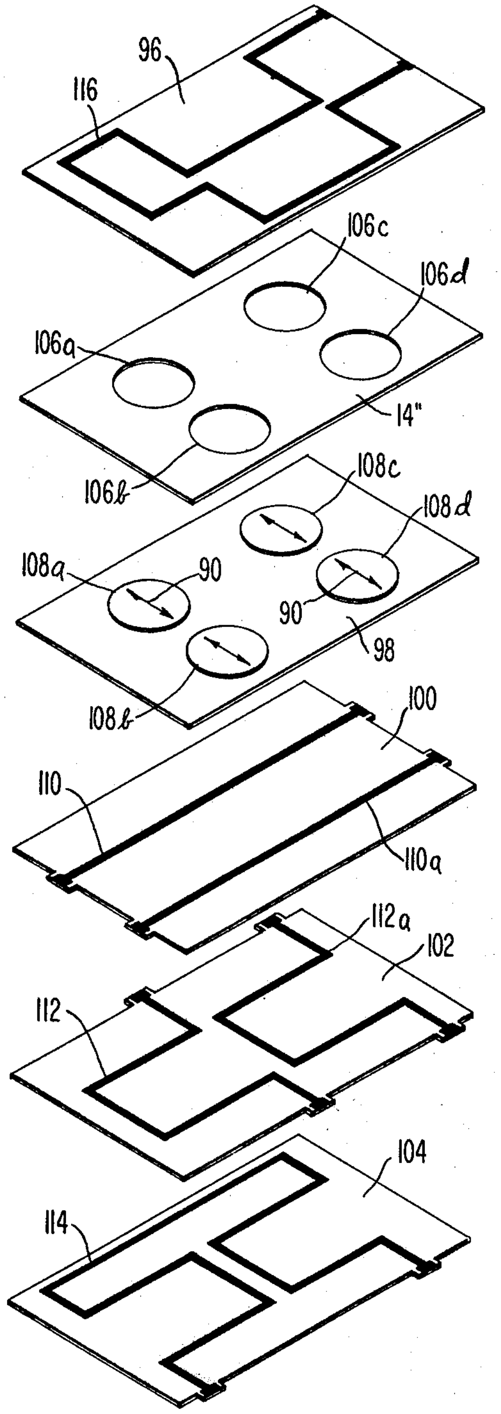
FIG. 5 is an exploded or separated view of another modification of the invention.
Figure 8:
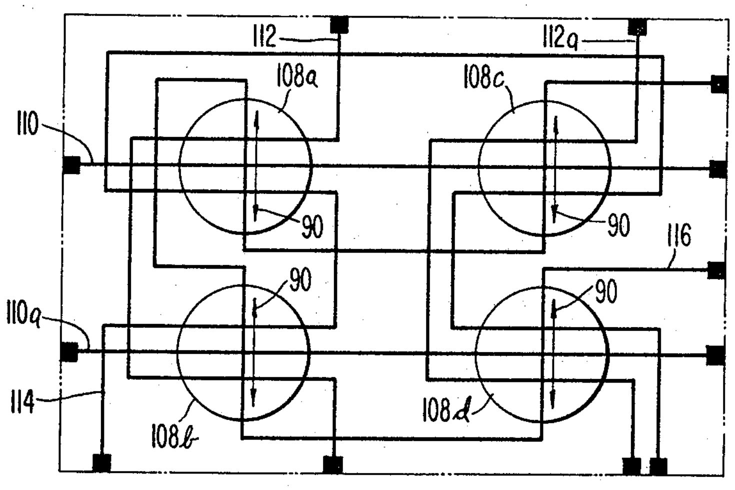
FIG. 8 is a diagrammatic plan view of the modification shown in FIGS. 5 and 6, and with insulating and shielding material omitted.
Figure 6:
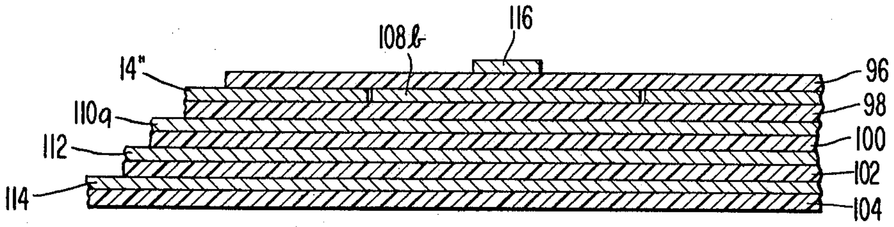
FIG. 6 is an enlarged sectional view of a fragment of the assembled modification shown in FIG. 5.

In the modification shown in FIGS. 5, 6 and 8 there are provided a number of panels 96, 98, 100, 102 and 104 of electrically insulating material such as Mylar, for example, and a panel or layer of the highly conductive, electrically conductive non-magnetic metallic shielding material 14" provided with a plurality of openings 106*a*–106*d* extending therethrough for receiving in the interior of the openings the magnetic thin film storage media, in this case also magnetic thin film elements 108*a*–108*d*, deposited on or otherwise bonded to the panel 98, and each of which has an easy direction of magnetization, as indicated by the double-headed arrows 90. In this modification, all the conductors and thin film elements also have a flat cross-section, similar to printed circuits.

Input drive conductors 110 and 110*a* are bonded to panel 100, and input drive conductors 112 and 112*a* are bonded to panel 102. The input reset drive conductor 114 is bonded to panel 104 and the output sense conductor 116 is bonded to panel 96. Thus in this modification, the output sense conductor 116 is entirely on one side of, or above, the shield layer 14" and all the input conductors are on the other side of, or below, the shield layer 14". Also, similar to the modification illustrated in FIG. 7, the output sense conductor 116 is preferably orthogonal to the input conductors where they cross the thin film elements 108*a*–108*d*. The input and output conductors are all inductively coupled to the respective ones of the thin film elements, over or under which they cross.

A write operation is provided with the modification shown in FIGS. 5, 6 and 8 in a manner similar to that described previously for the modification shown in FIGS. 3, 4 and 7 by energizing two of the input drive conductors, for example the input drive conductors 110 and 112 associated with the thin film element 108*a*, with half-select currents of such polarity that their magnetic fields add to either establish or switch the state of magnetization of the exemplary magnetic thin film element 108*a*, depending upon its previous state of magnetization. A read operation is also provided similarly by energizing the input reset conductor 114 with a full-select current of such polarity that its magnetic field will be opposite in direction to the direction of the write fields thereby to switch the state of magnetization of the thin film element 108*a*.

In order to point out more clearly the significance of the improvements made by the present invention in the construction and operation of miniaturized, closely packaged, magnetic devices of the kind described, it is to be noted that in an actual construction of a ferrite core array similar to the one shown in FIGS. 1 and 2, the longitudinal center-to-center distance between end cores 16*a* and 16*h*, for example, was 0.750 inch. In other words, the longitudinal center-to-center distance between adjacent cores, for example, the cores 16*e* and 16*f*, was 0.250 inch. Also, the transverse center-to-center distance between adjacent cores, for example the cores 16*a* and 16*e*, was 0.250 inch.

The miniaturized, densely packaged nature of the constructions shown in FIGS. 3–8 will be more fully appreciated by noting that a typical thickness of the glass panel and of the glass substrate is 0.045 inch; of the Mylar panels it is 0.001 inch; of the flat conductors it is 0.0005 inch; and of the thin film elements it is 2000 Angstroms.

It will now be seen that the present invention provides improvements in magnetic storage devices whereby such devices may be closely packaged, and in which capacitively and inductively coupled noise signals will be significantly reduced.

While there have been shown various constructions exemplary of the principles of the invention, and how these constructions are applied to a particular technique for switching the magnetic storage media, it is to be understood that these are but specific forms of the invention and that the invention is capable of being constructed in a variety of shapes, sizes and modifications, and of being applied to other switching techniques, without departing from its true spirit and scope. Accordingly, it is to be understood that the invention is not to be limited by the specific structures and mode of switching disclosed, but only by the subjoined claims.

What is claimed is:

1. A magnetic storage device comprising, a plurality of thin film magnetic storage elements arranged in a matrix of electrical rows and electrical columns, each magnetic storage element having multistable states of magnetization, two input row conductors each inductively coupled to at least two of said magnetic storage elements in a separate one of said rows, two input column conductors each inductively coupled to at least two of the magnetic storage elements in a separate one of said columns, each said input conductor having terminal portions whereby individual drive write currents may be applied to a selected row conductor and a selected column conductor of such polarity and magnitude that together their magnetic fields will cause the magnetic storage element common to the selected conductors to switch its state of magnetization from a reference state, but each magnetic field insufficient in itself to cause such an effect, an input conductor inductively coupled to all of said magnetic storage elements and provided with terminal portions for receiving a single reset drive read current of such polarity and magnitude that its magnetic field will be effective to switch a magnetic storage element back to its said reference state, an output conductor inductively coupled to a plurality of said magnetic storage elements located in said matrix for receiving a signal whenever a magnetic storage element is interrogated, and a flat sheet of highly conductive non-magnetic metal connected to a point of reference potential and positioned to be effective as an electrostatic and electromagnetic shield between at least a substantial portion of said output conductor and said input conductors.

2. A magnetic storage device comprising, a matrix of bistable state thin film magnetic storage elements arranged in electrical rows and in electrical columns, input row conductors on one side of said matrix and each inductively coupled to a row of said magnetic storage elements, input column conductors on the same side of said matrix and each inductively coupled to one of said columns of magnetic storage elements, said input conductors having terminal portions whereby drive currents may be applied to a selected row conductor and a selected column conductor to cause the magnetic storage element common to the selected conductors to store a bit of information, output conductor means coupled to said magnetic storage elements for receiving signals each indicative of a stored bit whenever a magnetic storage element is interrogated, and flat highly conductive shielding metal connected to a point of reference potential and effective as an electrostatic and electromagnetic shield between at least a substantial portion of said output conductor means and said input conductors.

3. A magnetic storage device comprising, a thin film magnetic core having bistable state storage capability, at least two input conductors inductively coupled to said magnetic core, each said input conductor having terminal portions for receiving drive currents both of which drive currents are necessary to store a bit of information in said magnetic core, an output conductor coupled to said magnetic core for receiving an output signal indicative of the stored bit when said magnetic core is interrogated, and means for minimizing capacitively coupled and inductively coupled noise signals generated in said output conductor when current is caused to flow in at least one of said input conductors, said means comprising a planar conductive shield member connected to a point of reference potential and positioned between at least a substantial portion of said output conductor and at least one of said input conductors and positioned further so that it spans said thin film in the area in which said thin film is coupled to said input conductors.

4. A magnetic storage device comprising, elements of thin film magnetic storage material each having two stable states of magnetization, an electric current output conductor inductively coupled to said magnetic elements, a plurality of electric current input conductors each inductively coupled to at least one of said magnetic elements, and flat electrically conductive material connected to a point of reference potential and providing electrostatic and electromagnetic shielding between at least a substantial portion of said output conductor and said input conductors.

5. A magnetic storage device comprising, elements of magnetic storage material having two stable states of magnetization and disposed in an electrical plane, an electric current output wire conductor having a substantial portion thereof on one side of said plane and only minor portions on the other side of said plane, each said minor portion being inductively coupled to one of said magnetic elements, a plurality of flat electric current input conductors between said substantial portion of said output conductor and said minor portions and each inductively coupled to at least one of said magnetic elements, and flat electrically conductive material providing electrostatic and electromagnetic shielding between said substantial portion of said output conductor and said input conductors.

6. A magnetic storage device comprising, elements of thin film magnetic material disposed in an electrical plane, an electric current output conductor having a first portion thereof on one side of said plane and a second portion thereof on the other side of said plane and being inductively coupled to said thin film elements, a plurality of electric current input conductors between said first and second portions of said output conductor and each inductively coupled to at least one of said thin film elements, and flat electrically conductive material connected to a point of reference potential and providing electrostatic and electromagnetic shielding between said first portion of said output conductor and said input conductors.

7. A magnetic storage device comprising, elements of thin film magnetic material disposed in an electrical plane, an electric current output wire conductor having a substantial portion thereof on one side of said plane and minor portions on the other side of said plane, each said minor portion being inductively coupled to one of said thin film elements, a plurality of flat electric current input conductors between said substantial portion of said output conductor and said minor portions and each inductively coupled to at least one of said thin film elements, and flat electrically conductive material providing electrostatic and electromagnetic shielding between said substantial portion of said output conductor and said input conductors.

8. A magnetic storage device comprising, elements of thin film magnetic material disposed in an electrical plane and each element having an easy direction of magnetization, an electric current output conductor having a first portion thereof on one side of said plane and a second portion thereof on the other side of said plane and being inductively coupled to said thin film elements, a plurality of elongate electric current input conductors between said first and second portions of said output conductor and each inductively coupled to certain of said thin film elements and having its longitudinal axis substantially normal to said easy directions of magnetization at the coupling regions, and flat electrically conductive material providing electrostatic and electromagnetic shielding between said first portion of said output conductor and said input conductors.

9. A magnetic storage device comprising, elements of thin film magnetic storage material each having two stable states of magnetization, an elongate electric current output conductor inductively coupled to said thin film elements, a plurality of elongate electric current input conductors each inductively coupled to at least one of said thin film elements and having its longitudinal axis substantially normal to the longitudinal axis of said output conductor at the coupling regions, and flat electrically conductive material connected to a point of reference potential and providing electrostatic and electromagnetic shielding between at least a substantial portion of said output conductor and said input conductors.

10. A magnetic storage device comprising, an electrically conductive shielding surface, a plurality of toroidal magnetic cores arranged on one side of said surface, a plurality of electric current input conductors on the same side of said surface and threading said magnetic cores, and an elongate electric current output conductor having minor portions only on said one side of said surface each threading one of said magnetic cores and having a substantial portion of its length on the other side of said surface.

11. A magnetic storage device comprising, elements of thin film magnetic material, a plurality of input conductors each inductively coupled to at least one of said thin film elements, at least one of said input conductors having at least a portion on one side of said thin film elements and at least one of said input conductors having at least a portion on the opposite side of said thin film elements, an output conductor inductively coupled to said thin film elements, and flat electrically conductive shield material between a substantial portion of said output conductor and said input conductor portions and connected to a point of reference potential.

12. A magnetic storage device comprising, elements of flat thin film magnetic material, a plurality of electric current input conductors inductively coupled to said thin film elements and positioned on one side thereof, an electric current output conductor inductively coupled to said thin film elements and positioned on the opposite side thereof, and a flat sheet of electrically conductive shield material connected to a point of reference potential and effective as an electrostatic and electromagnetic shield between said input and output conductors.

13. A magnetic storage device according to claim 12 wherein said flat sheet of electrically conductive shield material is coplanar with said elements of magnetic material.

14. A magnetic store comprising, a substantially flat panel of electrical insulating material, a metallic sheet fixedly placed against and substantially coextensive with one side of said panel, a plurality of electric current input conductors on the other side of said panel, elements of magnetic storage material having two stable states of magnetization and arranged on said other side of said panel, at least portions of which elements are disposed between said panel on the one hand, and said input conductors on the other hand, said input conductors being each common to a plurality of said elements of magnetic material and being so arranged that the direction of magnetization of said elements can selectively be changed by the selective transmission of pulses along said input conductors, and an electric current output conductor inductively coupled to said elements and having at least one portion on said other side of said panel and at least one other portion on the side of said metallic sheet which faces away from said panel, said metallic sheet providing electrostatic and electromagnetic shielding between said one other portion of said output conductor and said input conductors.

15. A magnetic storage device comprising, a substantially flat sheet of highly conductive metal, a plurality of electric current input conductors on one side of said sheet of conductive metal and each positioned so that a magnetic field generated by a current flowing therein will be attenuated by said conductive metal, thin films of magnetic storage material, each thin film inductively coupled to certain of said input conductors and disposed between said conductive metal and said input conductors, and an electric current output conductor inductively coupled to said thin films and having at least one portion on the same side of said conductive metal as are said input conductors and at least one other portion on the opposite side of said conductive metal, said sheet of conductive metal being arranged so as to minimize capacitively coupled noise between said input conductors and said one other portion of said output conductor.

References Cited

UNITED STATES PATENTS

| | | | |
|---|---|---|---|
| 2,732,542 | 1/1956 | Minnick | 340—174 |
| 3,102,999 | 9/1963 | Bernemyr et al. | 340—174 |
| 3,201,767 | 8/1965 | Bradley | 340—174 |
| 3,231,874 | 1/1966 | James | 340—174 |
| 3,360,787 | 12/1967 | Chang et al. | 340—174 |
| 3,191,162 | 6/1965 | Davis | 340—174 |

OTHER REFERENCES

Foglia, IBM Technical Bulletin, vol. 5, No. 1, June 1962.

BERNARD KONICK, Primary Examiner

BARRY L. HALEY, Assistant Examiner